United States Patent [19]

Riley et al.

[11] Patent Number: 4,827,769

[45] Date of Patent: May 9, 1989

[54] FUEL LEVEL SENSOR WITH BURIED CONDUCTOR

[75] Inventors: Richard E. Riley, Riverside; Kenneth Brown, Alta Loma, both of Calif.

[73] Assignee: Hamilton Standard Controls, Inc., Farmington, Conn.

[21] Appl. No.: 245,249

[22] Filed: Sep. 16, 1988

[51] Int. Cl.[4] .............................................. G01F 23/60
[52] U.S. Cl. .................................... 73/313; 73/304 R; 73/319; 338/33; 200/84 R; 340/624
[58] Field of Search ...................... 73/304 R, 308, 313, 73/319, 320, 301; 200/84 R; 340/624; 338/33

[56] References Cited

U.S. PATENT DOCUMENTS

| | | | |
|---|---|---|---|
| 4,229,972 | 10/1980 | Phillips et al. | 73/304 R |
| 4,454,761 | 6/1984 | Coulange | 73/308 |
| 4,554,831 | 11/1985 | Sealey et al. | 73/304 R |
| 4,560,986 | 12/1985 | Lew et al. | 73/313 |
| 4,567,762 | 2/1986 | Hoppert et al. | 73/313 |
| 4,626,874 | 12/1986 | Murai et al. | 73/304 R |
| 4,638,291 | 1/1987 | Puscasu | 73/304 R |
| 4,641,523 | 2/1987 | Andreasson | 73/313 |
| 4,702,107 | 10/1987 | Guerrini et al. | 338/33 |
| 4,757,305 | 7/1988 | Peso | 73/319 |
| 4,779,460 | 10/1988 | Cruickshank | 73/313 |

FOREIGN PATENT DOCUMENTS

| | | | |
|---|---|---|---|
| 2480937 | 10/1981 | France | 73/313 |
| 58-166216 | 10/1983 | Japan | 73/313 |
| 59-187226 | 10/1984 | Japan | 73/308 |
| 61-230030 | 10/1986 | Japan | 73/290 R |
| 2094983 | 9/1982 | United Kingdom | 73/295 |

Primary Examiner—William A. Cuchlinski, Jr.
Assistant Examiner—Diego F. F. Gutierrez

[57] ABSTRACT

A fuel level sensor 16 comprises a vertical member 20 and float 22 wherein said vertical member 20 comprises a steel substrate 26 encased in porcelain 28 with a thick film cermet resistive track 34 deposited thereon. A nickel deposit 36 at the bottom portion of the vertical member 20 facilitates electrical continuity between the substrate 26 and the resistive track 34 such that the substrate acts as a buried conductor enabling proportionality between magnitude of resistance and liquid level while diminishing the likelihood of conductor erosion and float interference.

4 Claims, 1 Drawing Sheet

FUEL LEVEL SENSOR WITH BURIED CONDUCTOR

TECHNICAL FIELD

This invention relates to a device for sensing the level of liquid in a tank, particularly for sensing the level of liquid fuel in a motor vehicle fuel tank.

BACKGROUND ART

Perhaps the leading use for liquid level sensing technology is in the area of motor vehicle fuel level detection. Motor vehicle fuel level detectors or sensors are subjected to a dynamic and harsh environment within the confines of a motor vehicle fuel tank. While such fuel level sensors generally are not required to indicate fuel levels with great precision, it is required that they do so reliably despite the dynamics of the environment.

Presently, motor vehicle fuel level sensors tend to be located within a cylinder inside the vehicle fuel tank, in close proximity to the vehicle fuel pump. Fuel level sensors tend to be vertically oriented resistive elements about which a float with a conductive element resides. Float position, relative to the resistive element, changes according to the level of liquid in the cylinder.

U.S. Pat. No. 4,702,107 is fairly representative of the technology of modern vehicle fuel level sensors. This patent discloses a rectangular vertically oriented insulating material contained within a cylindrical container, housed within a vehicle fuel tank. The insulating material has two primary functional sides. On one side two variable resistive elements run parallel longitudinally and are connected by transverse conductive elements. On the other side conductive tracks run substantially parallel to the resistive elements on the first side. A float is disposed about the vertically oriented insulating material. The float contains a fixed metal element shaped to coincidentally contact the transverse conductive elements attached to the variable resistive elements on one side and the parallel conductive tracks on the other. Upper ends of the variable resistive elements and conductive tracks are adapted to connect to an external electric circuit. With a DC voltage applied, the float position corresponding to the level of liquid in the tank, establishes a current path down through the portion of resistive elements above the float, across the metal element in the float, up the conductive track above the float to the external electric circuit. Consequently, resistance in the current path is inversely proportional to the level of liquid in the tank.

Certain level indicator meters, which attach to level sensors, make it desirable to generate a resistance directly proportional to the level of liquid in a tank (i.e. a higher fuel level corresponding with a higher resistance). A variable resistor with float configuration can facilitate this direct proportionality if the external circuit applying the DC voltage is connected to the bottom of the resistive element on the vertically oriented insulator. Such a connection results in a current path down a conductor from the external circuit to the bottom of a resistive element which is submersed in fuel. Current then flows up the resistive element to a metal element in the float, across the float to a conductive track and up to the external circuit. The higher the float is up the resistive element, the greater the resistance that current flow is subject to.

Difficulties arise in extending a conductor to the bottom of a submerged vertical insulator for connecting to a resistive element thereon. A separate conductor running the length of the vertical insulator presents a potential obstacle to a float which must slide uninhibitedly up and down the insulator. The separate conductor, which represents an additional part to be installed in some manner, adds cost to the assembly. Similarly, the additional conductor presents a potential source of discontinuity if worn or broken, detracting from the level of reliability of a sensor.

A conductor disposed on a surface of an insulator, parallel with a resistive element and connected with the resistive element at the bottom of the insulator presents an equally vexing problem. In a tank containing fuel contaminated with water, which is not miscible with hydrocarbon fuels, the water settles to the bottom of the tank because it is heavier than hydrocarbon fuels. Submerging an insulator with surface disposed conductors in water concentrated at the bottom of a fuel tank and applying a DC voltage, results in an electrolytic reaction wherein ions from the higher potential conductor connected to the resistor element migrate to the lower potential conductive track. Eventually the conductor connected to the resistive element fully erodes opening the circuit and rendering the fuel level sensor inoperable.

DISCLOSURE OF INVENTION

Objects of the invention include facilitating a non-obstructive, erosion resistant conductive path to the bottom of a resistive element disposed on a vertically oriented insulator of a fuel level sensor, which withstands the harsh environment of a vehicle fuel tank and provides for resistance in direct proportion to the level of liquid in the tank.

According to the invention, a conductive metal substrate with an encasing insulating layer provides a buried conductive path and is a vertically oriented member on which a float can follow the level of fuel, while an electrical connection from the bottom of the substrate to the bottom of a resistive element disposed on the insulating layer facilitates a conductive path conducive to direct proportionality between resistance and fuel level.

In accordance further with the invention, the vertically oriented member comprises a steel substrate encased in porcelain.

In further accord with the invention, the integral steel substrate, as a conductive path to the resistor bottom, facilitates a direct proportionality between resistive magnitude and liquid level, via a non-interfering, erosion resistant conductive path without adding additional parts and expense to a fuel level sensor assembly.

These and other objects, features and advantages of the present invention will become more apparent in light of the detailed description of an exemplary embodiment thereof, as illustrated in the accompanying drawings.

BEST MODE FOR CARRYING OUT THE INVENTION

Figure 1:
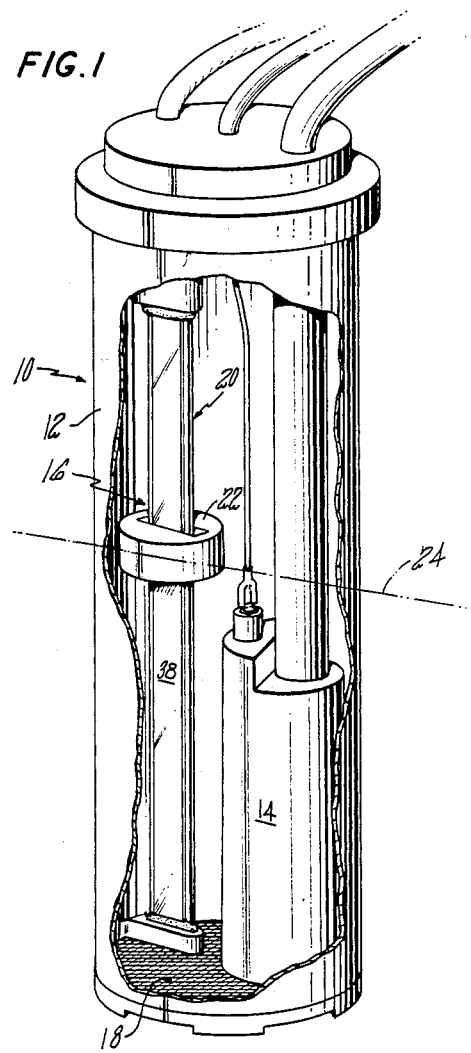
FIG. 1 is a perspective view, partly broken away and partly in section, of a fuel pump sensor module.

Referring now to FIG. 1, a fuel module 10 comprises a container 12 housing a fuel pump 14 and a fuel level sensor 16. A grid 18 at the bottom of the module 10 permits fuel to enter the container 12. The fuel level sensor 16 comprises an elongated, rectangularly shaped, vertically oriented member 20 which is positioned through a float 22. The float 22 rises and falls with the level of fuel 24 in the module 10.

Figure 2:
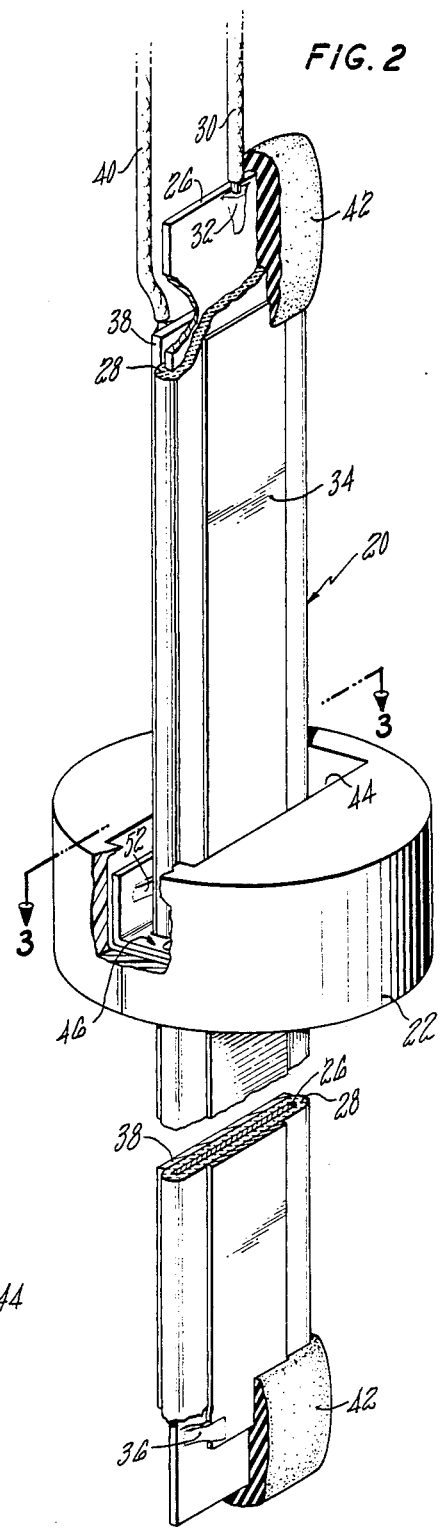
FIG. 2 is a perspective view, partly broken away and partly in section, of a fuel level sensor with buried conductor.

Referring to FIG. 2, the vertical member 20 comprises a soft steel substrate 26 which is encased almost entirely in porcelain 28. Though shown broken away near the bottom in FIG. 2, the porcelain 28 typically extends to the bottom of substrate 26. A substrate wire 30 is attached to a top portion of the substrate via a conductive nickel pad 32. The substrate wire 30 facilitates electrical continuity between external circuitry and the substrate 26. An oblong resistive track 34, composed of thick film cermet as is known in the art, is deposited onto the porcelain 28. A second conductive nickel pad 36 deposited near the bottom of the substrate 26, attaches the substrate bottom to the bottom of the resistive track 34. The nickel pad 36 completes a current path from the substrate wire 30, down the substrate 26 to the bottom of the resistive track 34 and upward along the resistive track 34.

A side of the vertical member 20, opposite the side with the resistive track 34, contains a beryllium copper conductor 38. The conductor 38 extends from near the top of the member 20 to near the bottom and is deposited onto the porcelain 28 so that the conductor 38 is electrically isolated from the steel substrate 26. A conductor wire 40 is attached to the top of the conductor 38.

Top and bottom portions of the vertical member 20 are protected by a coating of nitrile rubber 42 to prevent corrosion of the bare ends of the member 20.

Figure 3:
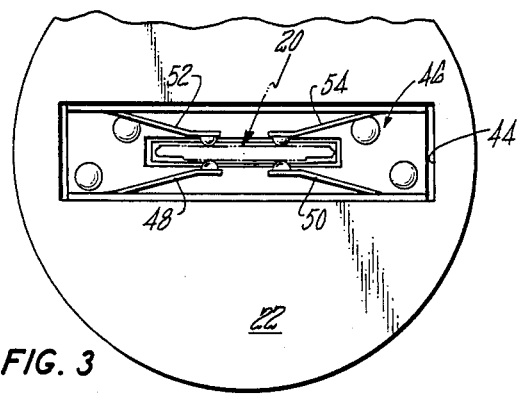
FIG. 3 is a top view of a fuel level sensor float, taken along line 3—3 of FIG. 2, with a fuel level sensor vertical member in phantom.

The float 22, as known in the art, is typically made of foamed nylon or hollow plastic or metal. As seen in FIG. 3, the float, formed in virtually any shape, has a rectangular slot 44. A contact assembly 46 is installed into the slot 44. The contact assembly 46 is stamped of tempered conductive metal, with four interconnected contacts 48, 50, 52, 54, opposed in pairs. The contact assembly 46 is heat staked or bonded in some other way to the float 22 so that the four contacts 48-54 extend into the slot 44. When the level sensor vertical member 20 is installed between the contacts 48-54 in the slot 44, one pair of contacts 48, 50 rest against the resistive track 34 and the other pair of contacts 52, 54 rest against the beryllium copper conductor 38. The contacts, because of their interconnected nature, effect electrical continuity between the resistive track 34 and the conductor 38. Each contact exerts a force of approximately 2-20 grams on the surface on which it rests.

A fully functional fuel level sensor has the vertical member 20 installed within the float 22, contained in a tank. The float 22 is buoyed at the level of the fuel 24 in the tank, causing the resistive track 34 to be shorted to the conductor 38 at points approximately equal to the float level and coincident with the contacts thereon. An electric current flowing from an external circuit into the substrate wire 30, will flow down the substrate 26, across the second conductive nickel pad 36 to the resistive track 34. Resistance to current flow is least at the bottom of the resistive track 34. Current will be subjected to resistance proportional to the level of fuel in the tank, since current flowing up the resistive track 34 is subject to greater resistance the higher up the track it flows. As current reaches the float level it will be shorted across the contact assembly to the beryllium copper conductor 38 and routed back to the external circuit.

The invention is described as a soft steel substrate 26 encased in porcelain 28 on which a thick film cermet resistive track 34 and beryllium copper conductor 38 are deposited. Equivalent embodiments could have the resistive track 34 and conductor 38 screen printed on in a thick film manner or they might be glued down, with a hydrocarbon and alcohol impervious adhesive, to the insulated substrate. The cermet resistive track 34 could be embodied as resistive paste or as a wire wound resistor or the like, in practicing this invention.

The substrate which acts as the buried conductor might be formed of any of various conductive metals. Similarly, any insulating material which is impervious to corrosion in a harsh hydrocarbon fuel or alcohol environment might be suitable for use as an alternative to the porcelain insulator described herein. The conductive beryllium copper used in the contact assembly 46 and the conductor 38 could effectively be other conductive metal alloys such as palladium silver or nickel silver. The float could be a hollow metal semi-toroid, sized to make contact with the resistive track 34 and the conductor 38. Likewise, an epoxy or nitrile rubber epoxy combination may be used to protect the top and bottom portions of the vertical member 20. Metals other than nickel may be used to fabricate conductive pads 32, 36.

Although the invention has been shown and described with respect to an exemplary embodiment thereof, it should be understood by those skilled in the art that the foregoing and various other changes, omissions, and additions in the form and detail thereof may be made therein without departing from the spirit and scope of the invention.

What is claimed is:

1. A level sensor for detecting the level of a liquid in a tank, wherein a moveable float disposed about an insulated vertical member rises and falls with the level of said liquid, said float having disposed thereon a plurality of interconnected metal contacts and said vertical member having disposed thereon a resistive track and an isolated conductive track, said resistive and conductive tracks being adapted to be connected to external electric circuitry, said float electrically interconnecting said resistive track and said conductive track at the level of said float corresponding with the level of said liquid, facilitating an electric current path through said resistive track across said float and through said conductive track, wherein the improvement comprises:

said vertical member comprising a conductive metal substrate having a top and bottom and having a substantial portion thereof encased in an insulating layer;

said resistive track having a top and a bottom and being deposited longitudinally on said insulating layer; and an electrical connection between the bottom of said resistive track to the bottom of said metal substrate such that said metal substrate establishes a buried conductive path to the bottom of said resistive track, thereby facilitating a direct proportionality between magnitude of resistance and level of liquid.

2. The level sensor of claim 1 wherein said vertical member comprises a steel substrate encased in porcelain.

3. The level sensor of claim 1 wherein said metal substrate is soft steel and said electrical connection to said resistive track bottom is made by forming a conductive nickel deposit between said metal substrate and said resistive track.

4. The level sensor of claim 1, wherein said resistive track is a thick film cermet and said metal contacts ride directly on said resistive track.

* * * * *